United States Patent [19]

Wadensten

[11] 4,042,102
[45] Aug. 16, 1977

[54] VIBRATORY CLEANER FOR AN ENDLESS CONVEYOR BELT

[76] Inventor: Theodore S. Wadensten, P.O. Box 8, Stilson Road, Wyoming, R.I. 02898

[21] Appl. No.: 694,379

[22] Filed: June 9, 1976

[51] Int. Cl.$^2$ ............................................. B65G 45/00
[52] U.S. Cl. ................................................. 198/494
[58] Field of Search ............... 198/493, 494, 497, 498, 198/499; 74/230

[56] References Cited

U.S. PATENT DOCUMENTS

| 2,873,847 | 2/1959 | Holland | 198/494 |
| 2,885,069 | 5/1959 | Bowen | 198/494 |
| 3,220,540 | 11/1965 | Frontczak | 198/494 |
| 3,802,554 | 4/1974 | Paulsen et al. | 198/494 |

FOREIGN PATENT DOCUMENTS

| 2,403,153 | 7/1974 | Germany | 198/494 |
| 51,222 | 5/1966 | Poland | 198/494 |
| 129,126 | 9/1959 | U.S.S.R. | 198/494 |

Primary Examiner—Evon C. Blunk
Assistant Examiner—Jeffrey V. Nase
Attorney, Agent, or Firm—Ralph R. Roberts

[57] ABSTRACT

The cleaning of conveyor belts has been a problem since their widespread acceptance and adoption for the transporting of materials. Many materials so conveyed have a tackiness or an affinity for the outer surface of the belt of the conveyor. When this occurs the cleaning or removal of this material from the surface of the belt becomes a problem. Prior to the present invention scrapers, brushes and similar devices have been widely used for removing this material or residue adhering to the conveyor belt. In the present invention there is shown a vibration device which is attached so as to vibrate a roller. This device is carried on the under and inner side of the conveyor belt so that this vibration occurs shortly after the discharge of the material from this belt. Shortly after passing over the discharge roller the conveyor belt is brought in way of a vibrated roller whereby any residual material on the exterior of the belt is loosened and knocked free by means of the localized vibrations. Two embodiments are shown. In both embodiments the vibrator directly actuates the free-turning roller which is carried on the end of a pair of swinging arms. The weight of the vibrator and the roller is not excessive and is locally applied to the inner side and under extent of the belt. In one embodiment the vibrator is carried below the belt and the roller is carried on a bracket pivotally supported at the end of a pair of swinging arms. In the other embodiment the roller and vibrator are both carried on a pair of swinging arms with the vibrator and roller within the confines of the upper and lower extents of the belt.

6 Claims, 4 Drawing Figures

VIBRATORY CLEANER FOR AN ENDLESS CONVEYOR BELT

BACKGROUND OF THE INVENTION

1. Field of the Invention

With reference to the classification of art as established in the United States Patent and Trademark Office the present invention pertains to the Class entitled, "Conveyors, power driven" (Class 198) and particularly to the subclass entitled, "cleaners".

2. Description of the Prior Art

Scrapers, brushes and spoked wheels imparting a fixed amount of vibration to the belt are shown in prior art devices. Insofar as is known, these prior art devices do not provide an adjustability or high frequency vibrations which are provided in the present devices. It is anticipated that either air or electric vibrators may be provided and that the cycle of vibrations imparted to the belt is from twelve hundred to nine thousand vibrations per minute.

Among the conveyor belts commonly used to transport materials particularly up and down slopes are belts having toothed or corrugated surfaces. Scrapers and/or brushes often are unsatisfactory in removing items from these belts. Among the many reasons is size and fragile construction or composition. The vibrating apparatus of this invention is particularly useful for removing items from the contoured surfaces of the conveyor belt. The frequency and amplitude of the vibrator is adjusted to accommodate the particular item and belt.

SUMMARY OF THE INVENTION

This invention may be summarized at least in part with reference to its objects.

It is an object of this invention to provide, and it does provide, a variable speed vibrator which transmits vibrations to a free-turning roller which is in gravitational contact with the inside of a conveyor belt.

It is a further object of this invention to provide, and it does provide, a vibrating roller which engages the inside of a conveyor belt on the lower, inner extent thereof with the vibrating roller and vibrator carried on the end of a pair of swinging arms and with a vibrator adjustable from twelve hundred to nine thousand cycles per minute.

This invention provides a vibrating apparatus which may be adjusted to the desired frequency and force of from twelve hundred to nine thousand cycles per minute. These vibrations are transmitted to a free-turning roller which is in gravitational engagement with the inside of a conveyor belt on the returning extent of this belt near to the discharge pulley. Two embodiments are shown. In both embodiments it is desired to carry the vibrating roller close to the discharge pulley and for removal of the attracted material as close to the discharge end as practical. The vibrator is below the belt in one embodiment. In both embodiments the vibrator is carried by a bracket so that if required or desired additional weight may be placed upon this bracket to increase the intensity of the vibrations of the freely turning pulley against the belt. In the other embodiment the bracket, vibrator and roller are carried between the longitudinal extents of the belt and the freely turning roller is directly vibrated by the vibrator which is adjusted as to speed to effectively remove the material adhering to the belt surface.

In addition to the above summary the following disclosure is detailed to insure adequacy and aid in understanding of the invention. This disclosure, however, is not intended to cover each new inventive concept therein no matter how it may later be disguised by variations in form or additions of further improvements. For this reason there has been chosen two specific embodiments of the vibrating assembly as adopted for use with a conveyor belt and showing a preferred means for vibrating the freely turning roller. These specific embodiments have been chosen for the purposes of illustration and description as shown in the accompanying two sheets of drawings wherein:

BRIEF DESCRIPTION OF THE DRAWINGS

In the following description and in the claims various details are identified by specific names for convenience; these names, however, are intended to be generic in their application. Corresponding reference characters refer to like members throughout the four figures of the drawings.

The drawings accompanying, and forming part of, this specification disclose certain details of construction for the purpose of explanation of the broader aspects of the invention, but it should be understood that structural details may be modified and that the vibration assembly may be incorporated in other structural forms than shown.

Figure 1:
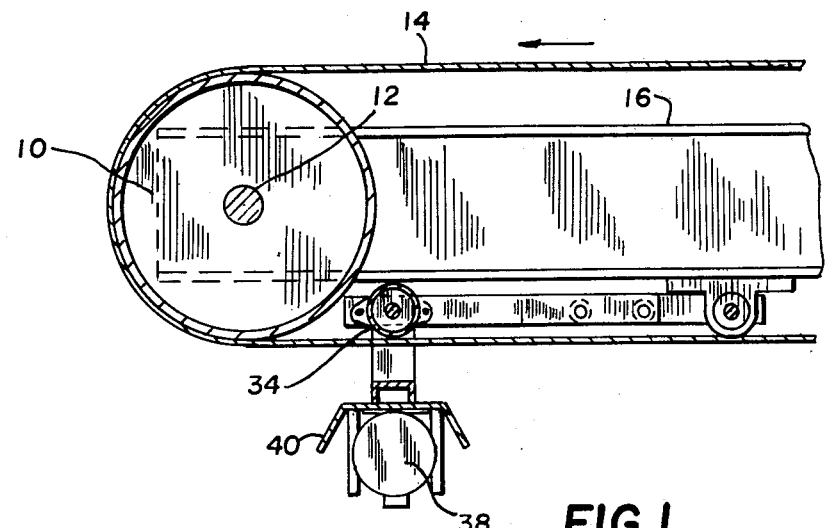
FIG. 1 represents a fragmentary side view, partly diagrammatic, of a conveyor belt and vibrator with a portion thereof shown in section to illustrate the relationship of the several components, the vibrator of this embodiment being carried on a bracket so that it is below the return extent of the belt.
Figure 2:
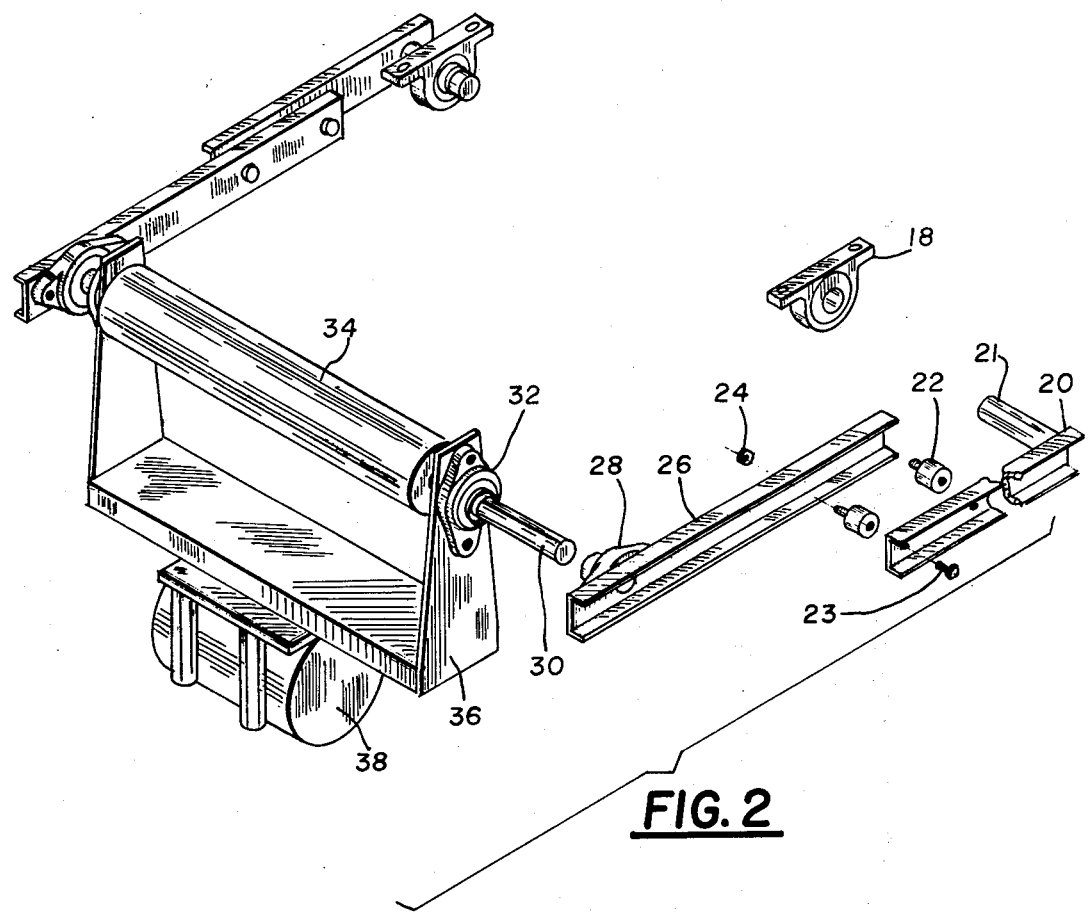
FIG. 2 represents an expanded isometric view of the several components of FIG. 1 and showing the relationship of these components providing the vibrator assembly.

DESCRIPTION OF THE EMBODIMENT OF FIGS. 1 and 2

Referring now in particular to FIGS. 1 and 2, it is to be noted that this embodiment is a more-or-less diagrammatic representation of a vibrator as mounted on a conveyor belt frame. As depicted, a discharge or tail-end pulley 10 is carried on a shaft 12 which may be powered or unpowered as the particular conveyor construction or operation dictates. This pulley 10 may be covered by an appropriate resilient material or lagging as determined by the use of the belt. This belt 14 is shown with both a forward and return extent portion. This belt is utilized to carry items or articles and, as depicted, is moving leftward on its upper extent and counterclockwise around the pulley 10.

On the lower or return extent of this belt 14 is provided the vibrating cleaner assembly of this invention. Pulley 10 is carried by a frame 16 which carries the pulley by supports, not shown. On this frame 16 is mounted pillow blocks 18 which are adapted to carry pivoted brackets 20. These brackets include pivot pins 21 which are mounted and retained in pillow blocks 18. Rubber isolator members 22 are retained by cap screws 23 and nuts 24 and are disposed between the bracket 20 and support arms 26. These isolators are provided to remove unwanted vibrations from the frame of the conveyor. Arms 26, as depicted, are small U-shaped or channel structural members. On the left or near end of these support arms are mounted bearings 28 which rotatably support a shaft 30. This shaft is carried in antifriction bearings 32 mounted on the upper extending ends of U-bracket 36. These bearings 32 insure that roller 34 carried on shaft 30 is free turning and is driven only by the engagement of the traveling belt 14. A bracket 36 is carried by bearings 32 and on its lower cross bar or member portion carries a vibrator unit 38. This vibrator may be either electrically powered or a pneumatic vibrator with either vibrator having a variable speed and force capability. As seen in FIG. 1, if desired, a deflector 40 may be provided to insure that the material removed from the belt 14 by the vibration of the roller 34 does not fall into or affect the actuation of the vibrator 38.

USE AND OPERATION

The apparatus depicted in the drawings and in FIGS. 1 and 2 is applied to an existing conveyor having a conveying belt 14 which carries material having an affinity for or otherwise is retained by the surface of this belt. It is assumed that this material is best removed by vibrations rather than by scraping or a brushing action. Much of this type of material may be removed by high-speed vibrations. In the present invention roller 34 is brought into engagement with the under, inner surface of this belt. This roller is free turning on shaft 30 and the vibrator 38 transmits its adjusted vibration to shaft 30 through U-support bracket 38. It is contemplated that these vibrations will be from twelve hundred to nine thousand cycles per minute.

The vibrations transmitted to the pivoted arm members 26 are isolated by members 22 to provide a desired amount of dampening action or transmitted to the frame of the conveyor. Since the bracket 36 is carried by shaft 30 which is free turning by bearing 28, this bracket is maintained in the vertical condition by means of gravity. The vibrations produced in the vibrator 38 are electrically or pneumatically controlled to give a precise or satisfactory vibration and force rate which removes the material clinging to the surface of the conveyor belt 14. This variation of speed and force is highly desirable. Several factors determine the adherence of a material to the belt among which is when the material is affected by humidity or manufacturing conditions. Assuming that the items being transported are affected by moisture, the residual variation of moisture can be accommodated by increasing or decreasing the rate of vibration, the amplitude of vibration, and the force. If the material is slightly tacky of sticky because of painting and the like, the coating on these items may also have an attraction for the belt 14 and may not be readily discharged therefrom.

The vibrator of FIGS. 1 and 2 may be utilized to insure that the residual material is removed from the belt and by means of a chute, not shown, delivered to the accumulating bin, as desired. This vibrator induces vibrations which are not naturally harmonic.

Figure 3:
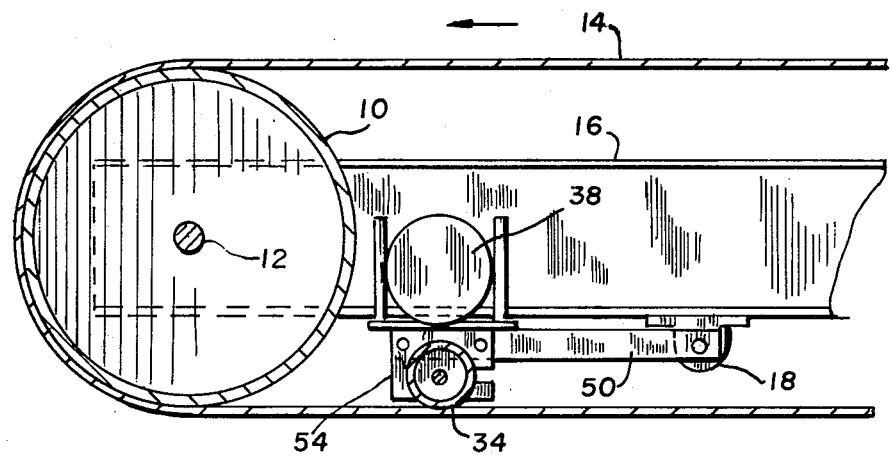
FIG. 3 represents a fragmentary side view, partly diagrammatic, of an alternate arrangement whereby the vibrator is carried above the roller and both the conveyor belt apparatus and vibrator apparatus is similar to that in FIG. 1 but the vibrator and roller are between the extents of the conveyor belt.
Figure 4:
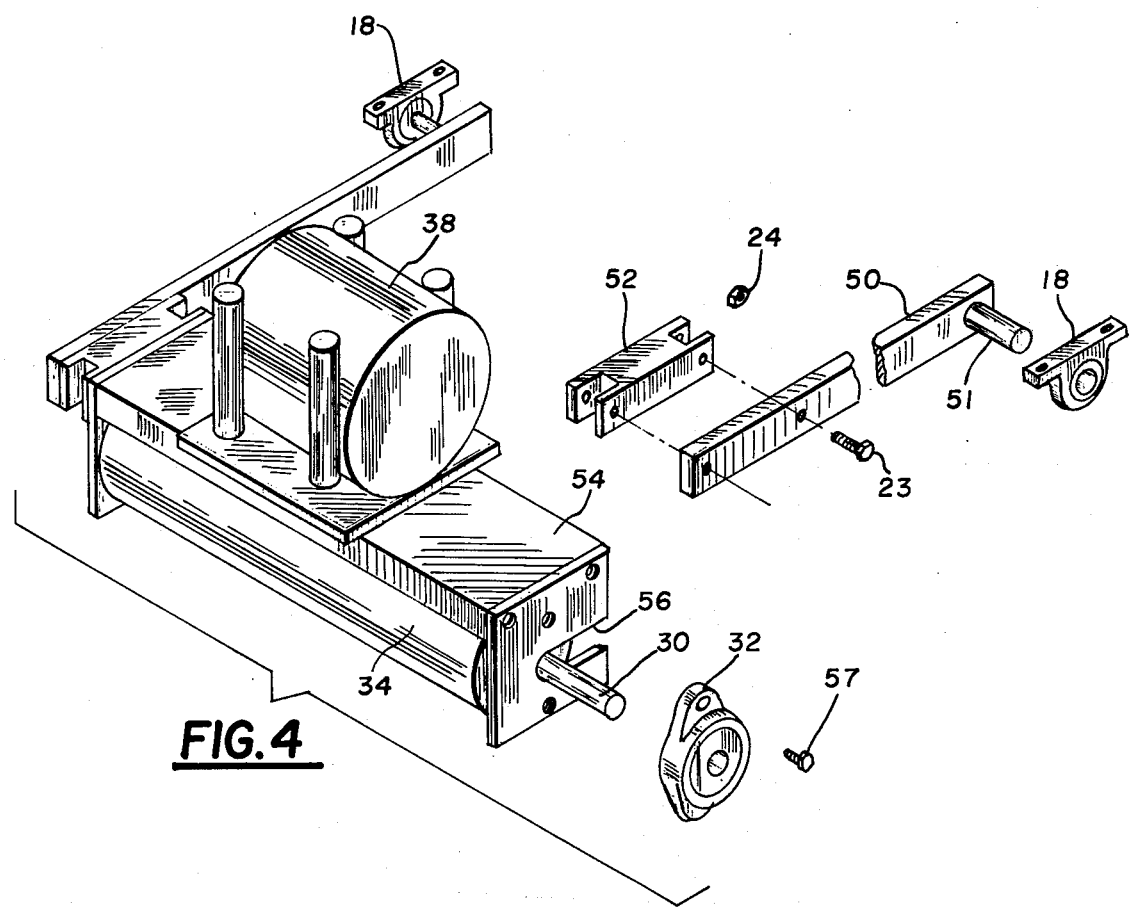
FIG. 4 represents an expanded isometric view of the vibrating unit of FIG. 3.

ALTERNATE EMBODIMENT OF FIGS. 3 and 4

Referring next and finally to FIGS. 3 and 4, there is shown an alternate embodiment of the vibrator of FIGS. 1 and 2. Instead of the vibrating unit being carried below the belt, the vibrating unit is carried above the free turning roller and between the forward and return (ie. upper and lower) extents of the conveyor belt. As in FIG. 1, there is depicted a pulley 10, a shaft 12, a belt 14 and a frame 16. Pillow blocks 18, similar or identical to the pillow blocks shown in FIG. 1, are attached to the frame 16 to carry pivot arms 50. These arms have extending pivot pins 51 which are mounted in and extend into and are carried by the pillow blocks 18. A vibration isolator 52 is carried by screws 23 and nuts 24 and is secured to arm 50 and on the other side to an end portion of a U-shaped support bracket 54. Bracket 54 carries bearings 32 and roller 34 and shaft 30, as depicted. For the ready removal of the shaft and roller 34 the end plates of the U-shaped bracket member 54 are provided with cutouts 56.

USE AND OPERATION

As depicted, the pillow blocks 18 ae secured to the frame 16 and retained on pivot arms 50 by means of pivot pins 51. Screws 23 and nuts 24 retain the arms 50 in the desired position to one side of the vibration isolating blocks 52. Screws 23 and nuts 24 may also be secured to the end members of the U-shaped support 54. After assembly of this U-shaped bracket to the pivot arm 50, the vibrator 38 may be mounted to the top of the U-bracket 54. Screws 57 may be used to retain pillow blocks 32, shaft 30 and roller 34 to the end members of the U-bracket 54. Gravity is used to bring the roller 34 into engagement with the inner, under side of the belt 14 and the arms 50 allow the gravitational force to bring this vibrating means into a desired effect. As so arranged the vibrator and the roller are carried within the confines of the belt and any residue or items remaining on the belt are not obstructed by a vibrator or deflector so that when loosened by vibrations the area below the belt is completely clear as far as this disposition of a chute and removal of the discharged material.

Although the arms are shown as carried by pillow blocks 18 secured to the frame 16, this is not to preclude the mounting of these pillow blocks to other support means. As long as the vibrating roller is movable toward and to the inside surface of the return extent of belt and is free turning, an adjustable vibrating force may be applied to the return entent of a conveyor belt. The isolating of vibrations from the frame of the conveyor is desirable when the behavior of the transported material on the upper extent of belt and around the pulley is to be considered.

As a method the above description and apparatus provides the steps of cleaning an endless conveyor belt as carried by head and tail pulleys and a typical support frame, said method disposed to remove attracted particles from the carrying surface of the belt as the belt is moved on its return portion of movement, said method cleaning steps including: providing a fixed support and maintaining this support in a fixed relationship to a conveyor belt and frame; mounting a pair of like arms and pivotally retaining said arms at one end to and by the fixed support; carrying a shaft at the other end of the pivotally mounted and maintained arms; carrying a freely turning roller on and by this shaft, the roller engaging the inside surface and under extent of the conveyor belt; carrying a bracket on the swinging ends of the pivoted arms, and mounting a variable speed and force vibrator by and on the bracket with the vibrator having a vibrating range of twelve hundred to nine thousand cycles per minute and mounting and attaching the vibrator to the bracket so that vibrations from the vibrator are transmitted to the roller and from the roller locally to the conveyor belt which is vibrated at this localized portion to remove unwanted material from the outer surface of the belt.

Terms such as "left", "right", "up", "down", "bottom", "top", "front", "back", "clockwise", "counterclockwise" and the like are applicable to the embodiments shown and described in conjunction with the drawings. These terms are merely for the purposes of description and do not necessarily apply to the position in which the conveyor belt, support or the associated vibrator may be constructed or used.

While particular embodiments of the vibratory apparatus as applied to conveyor belts have been shown and described it is to be understood modifications may be made within the scope of the accompanying claims and protection is sought to the broadest extent the prior art allows.

What is claimed is:

1. A vibratory belt cleaning apparatus for an endless conveyor belt as carried by head and tail pulleys on and by a conveyor frame, said apparatus disposed immediately adjacent the tail pulley to remove attracted particles from the carrying surface of the belt as the belt is moved on its return portion of movement and prior to the return extent of belt reaching a snubber roller, idler pulley and the like which engages the carrying surface of the belt on the return extent, said belt cleaning apparatus including: (a) a support means for the conveyor belt and frame; (b) a first pair of arm members of like length, each pivotally retained at one end to and by the conveyor frame; (c) a second pair of arm members each having one end adapted to retain and carry a roller shaft, the other end of these arms adapted for attachment to the first arm member; (d) a shaft carried at each end by one of the second arm members; (e) a freely turning roller carried on and by the shaft, the roller disposed to engage the inside surface and under extent of the conveyor belt at said immediately adjacent position next to the tail pulley; (f) a vibrator isolator interposed between each of the first and second arm members where they are joined to form an arm assembly, these isolators inhibiting vibration transmittal from the pulley to the conveyor frame; (g) a bracket carried by the swinging ends of the pivoted arm assemblies, and (h) a variable speed and force vibrator carried by and on the bracket and having a vibratory range of twelve hundred to nine thousand cycles per minute, the vibrator so mounted and attached to the bracket that the vibrations from the vibrator are transmitted to the roller and from the roller to the conveyor belt which is locally vibrated to remove unwanted material from the outer surface of the belt, the bracket, vibrator and roller gravitationally urged toward the under extent of the belt with only the roller engaging the belt and with the vibrations from the vibrator isolated by the arm mounted isolators from the conveyor frame.

2. A cleaning apparatus as in claim 1 in which the bracket which carries the vibrator is generally U-shaped with the extending ends pivotally carried by the shaft on which is mounted the freely turning roller, and in which the vibrator is carried on the midportion of the U-shaped bracket and with the midportion disposed below the return extent of belt.

3. A cleaning apparatus as in claim 2 in which there is provided a deflector which is disposed to prevent the removed material from entering the mechanism of the vibrator.

4. A cleaning apparatus as in claim 2 in which the shaft carrying the freely turning roller is carried in antifriction bearings mounted on the ends of the pivotally mounted arm assemblies.

5. A method of cleaning by locally vibrating the lower extent of an endless conveyor belt as carried by head and tail pulleys and a conveyor frame, disposed immediately adjacent the tail pulley to remove attracted particles from the carrying surface of the belt as the belt is moved on its return portion of movement and prior to the return extent of the belt reaching a snubber roller, idler pulley and the like which engages the carrying surface of the belt on the return extent, said method cleaning steps including: (a) providing a support means for the conveyor belt and frame; (b) mounting a first pair of arm members of like length, each pivotally retained at one end to and by the conveyor frame; (c) mounting a second pair of arm members each having one end adapted to retain and carry a roller shaft, the other end of these arms adapted for attachment to the first arm member; (d) carrying a shaft at each end by one of the second arm members; (e) carrying a freely turning roller on and by the shaft, the roller disposed to engage the inside surface and under extent of the conveyor belt at said immediately adjacent position next to the tail pulley; (f) interposing a vibrator isolator between each of the first and second arm members where they are joined to form an arm assembly, these isolators inhibiting vibration transmittal from the pulley to the conveyor frame; (g) carrying a bracket by the swinging ends of the pivoted arm assemblies, and (h) mounting a variable speed and force vibrator by and on the bracket and having a vibratory range of twelve hundred to nine thousand cycles per minute, the vibrator so mounted and attached to the bracket that the vibrations from the vibrator are transmitted to the roller and from the roller to the conveyor belt which is locally vibrated to remove unwanted material from the outer surfae of the belt, the bracket, vibrator and roller gravitationally urged toward the under extent of the belt with only the roller engaging the belt and with the vibrations from the vibrator isolated by the arm mounted isolators from the conveyor frame.

6. A method of cleaning as in claim 5 in which the bracket which carries the vibrator is generally U-shaped with the extending ends pivotally carried by the shaft on which is mounted the freely turning roller, and which includes mounting the vibrator on the midportion of the U-shaped bracket and with the midportion disposed below the return extent of belt.

* * * * *